INVENTOR.
MAURICE E. PEEPLES
BY

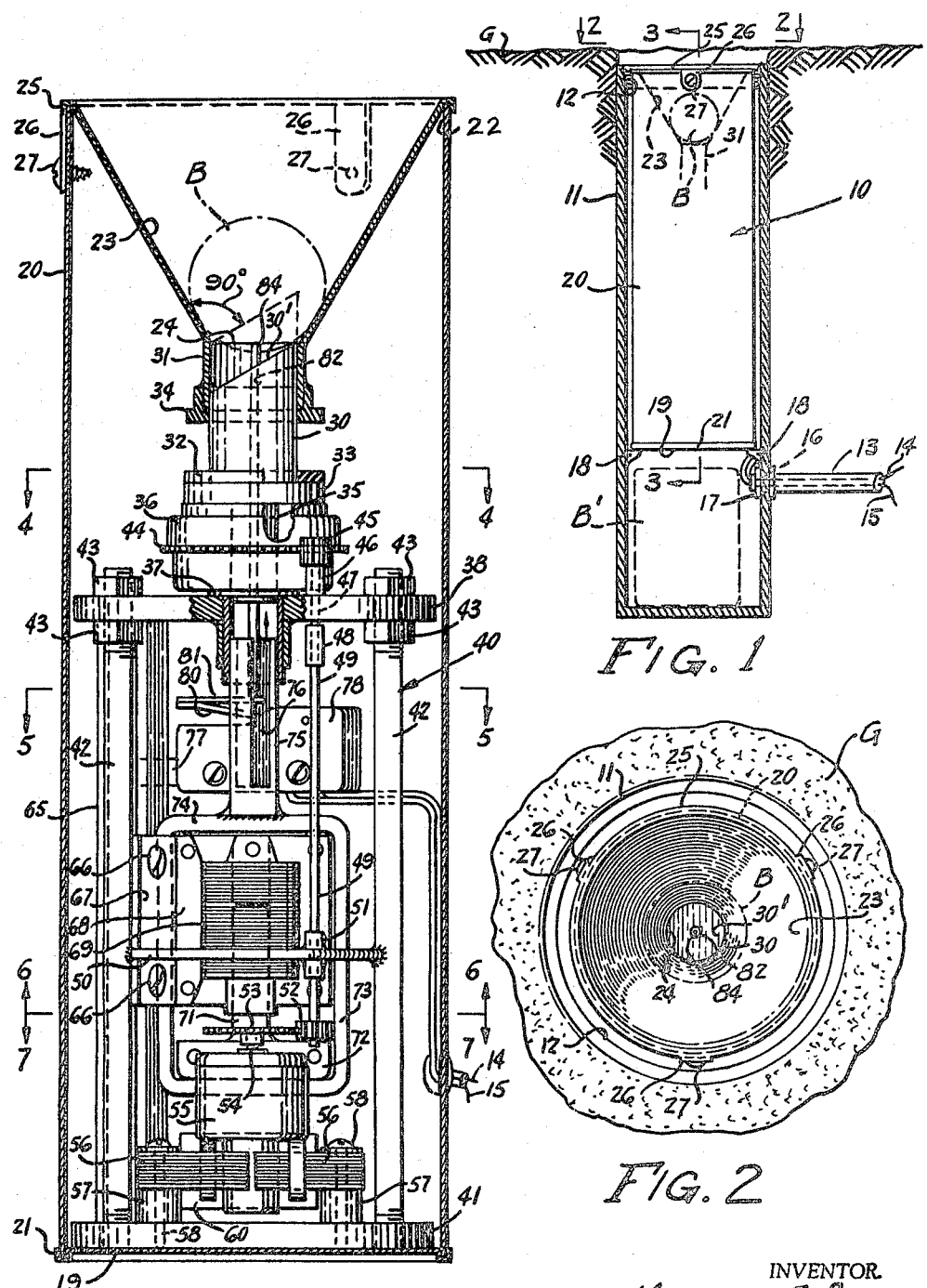

ATTORNEYS.

March 21, 1967 — M. E. PEEPLES — 3,310,312
DEVICE FOR RANDOMLY EJECTING ARTICLES
Filed April 30, 1964 — 7 Sheets-Sheet 3

INVENTOR.
MAURICE E. PEEPLES
BY

ATTORNEYS.

March 21, 1967  M. E. PEEPLES  3,310,312

DEVICE FOR RANDOMLY EJECTING ARTICLES

Filed April 30, 1964  7 Sheets-Sheet 4

INVENTOR.
MAURICE E. PEEPLES
BY

ATTORNEYS.

March 21, 1967  M. E. PEEPLES  3,310,312
DEVICE FOR RANDOMLY EJECTING ARTICLES
Filed April 30, 1964  7 Sheets-Sheet 5

INVENTOR.
MAURICE E. PEEPLES
BY

ATTORNEYS.

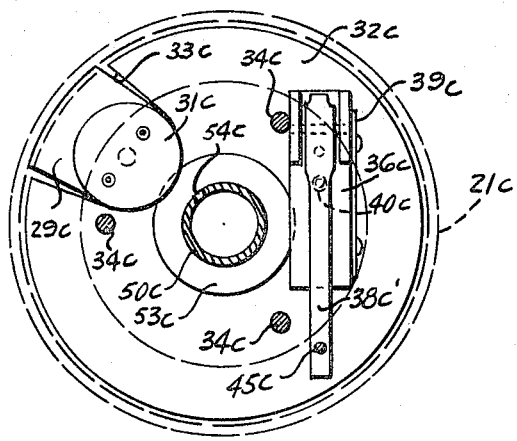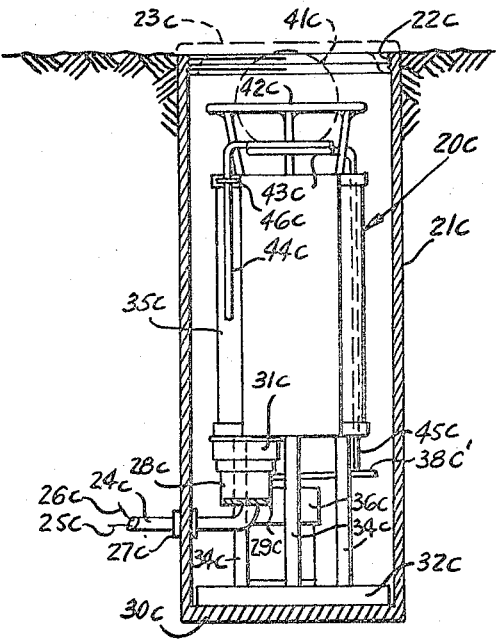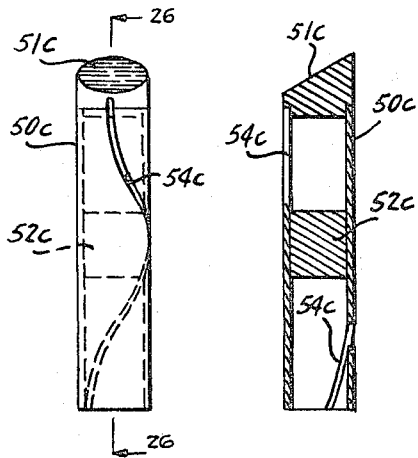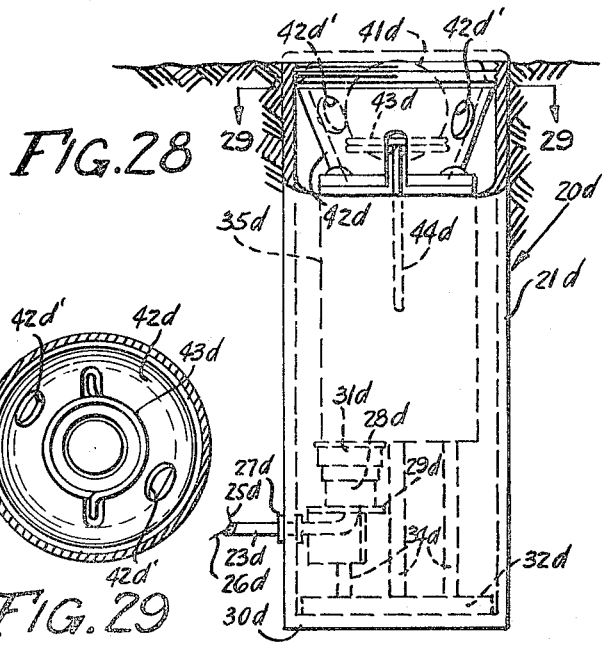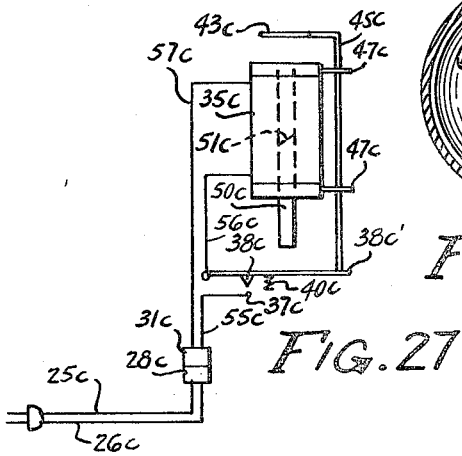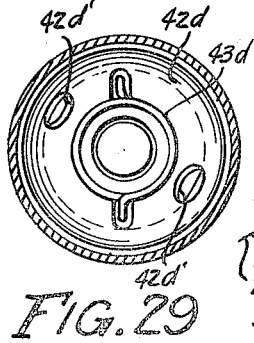

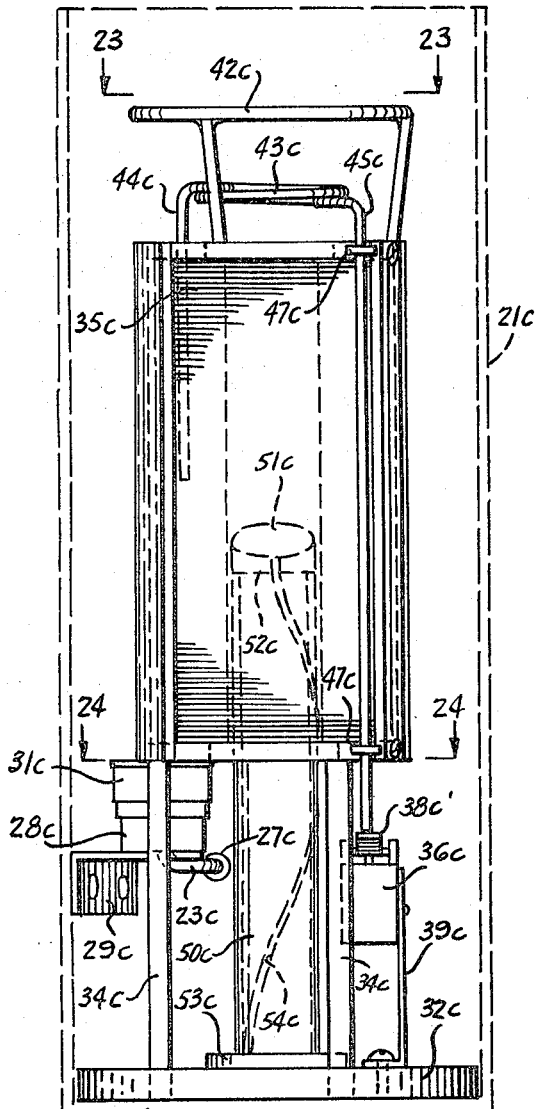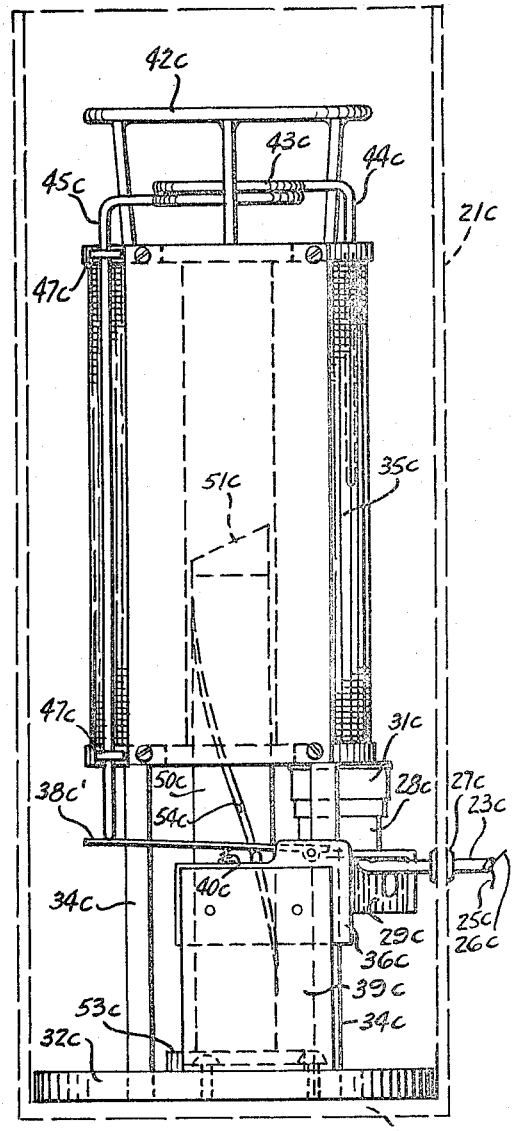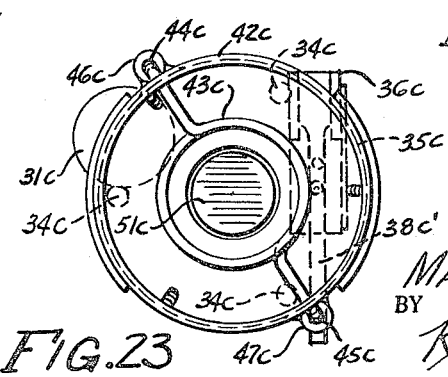

United States Patent Office 3,310,312
Patented Mar. 21, 1967

3,310,312
DEVICE FOR RANDOMLY EJECTING ARTICLES
Maurice E. Peeples, P.O. Box 235,
Kingsland, Ga. 31548
Filed Apr. 30, 1964, Ser. No. 363,868
15 Claims. (Cl. 273—179)

This invention relates to a device for randomly ejecting articles and more particularly to a device for ejecting successively received articles such as golf balls or the like in random radial directions, the instant application being a continuation-in-part of application Ser. No. 293,622 filed July 9, 1963, now abandoned, and application Ser. No. 349,934, filed Mar. 5, 1964.

A primary object of this invention is the provision of an improved article ejecting device which is sturdy and durable in construction, reliable and efficient in operation, and relatively simple and inexpensive to manufacture, assemble, utilize, and maintain.

Another object of this invention is to provide an improved golf practice putting device which will automatically eject successively received golf balls in random directions.

A further object of the instant invention is the provision of various embodiments of article ejecting means which may be received in a hole in the ground and used to eject golf balls or the like in random directions whereby the player may putt the balls back into the device.

A still further object of this invention is the provision of a device of the type described which may be positioned on top of the ground and utilized merely as a ball dispensing device, the player putting the ball into a separate cup.

Yet another object of this invention is to provide an article ejecting means which, with slight modifications, will function to eject any desired article, such as golf balls, baseballs, billiard balls, dice or the like.

A further object of this invention is the provision of an article ejecting means which, in addition to its basic use for practicing golf putting, will have various other utilities obvious to those with ordinary skill in the art in games or similar amusement devices.

Still another object of the instant invention is to provide an article ejecting device which is operated electrically, and which may be powered either by batteries or by a remote source of electrical current.

A further object of the instant invention is to provide a golf practice putting device which may be left in a hole in the ground provided therefor, with cap or cover means being utilized to seal the same against the weather and to protect the same from vandals.

Other and further objects reside in the combination of elements, arrangement of parts, and features of construction.

Still other objects will in part be obvious and in part be pointed out as the description of the invention proceeds and as shown in the accompanying drawings wherein:

FIGURE 1 is a vertical sectional view through a practice hole, showing the positioning of one form of the device of the instant invention therein, and illustrating in dotted lines the location of the battery and their remote current source connection;

FIGURE 2 is an enlarged top plan view of the embodiment of FIGURE 1 positioned in the hole, taken substantially along the line 2—2 of FIGURE 1;

FIGURE 3 is an enlarged sectional view taken substantially along the line 3—3 of FIGURE 1 as viewed in the direction indicated by the arrows;

FIGURE 20 is a vertical sectional view through a practice hole, showing the positioning of still another embodiment of the device of the instant invention therein;

FIGURE 21 is an enlarged side elevational view of the embodiment of FIGURE 20 with the container or housing means shown in dotted lines;

FIGURE 22 is a side elevational view taken at substantially 90° with respect to FIGURE 21;

FIGURE 23 is a top plan view of this embodiment;

FIGURE 24 is a transverse cross-sectional view taken substantially along line 24—24 of FIGURE 21 as viewed in the direction indicated by the arrows;

FIGURE 25 is a side elevational view of the plunger means for this embodiment;

FIGURE 26 is a vertical cross-sectional view taken substantially along line 26—26 of FIGURE 25 as viewed in the direction indicated by the arrows;

FIGURE 27 is a schematic wiring diagram illustrating the electrical circuitry thereof;

FIGURE 28 is a side view, partly in elevation and partly in cross-section, showing a practice hole having another embodiment of the device of the instant invention positioned therein; and FIGURE 29 is a transverse cross-sectional view taken substantially on line 29—29 of FIGURE 28 as viewed in the direction indicated by the arrows.

Similar reference characters refer to similar parts throughout the several views of the drawings.

Figure 4:
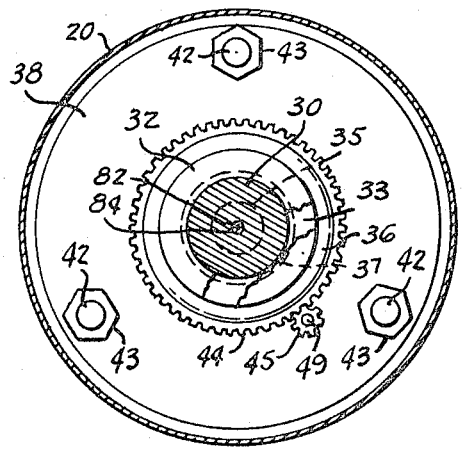
FIGURE 4 is a sectional view taken substantially along the line 4—4 of FIGURE 3, as viewed in the direction indicated by the arrows.
Figure 5:
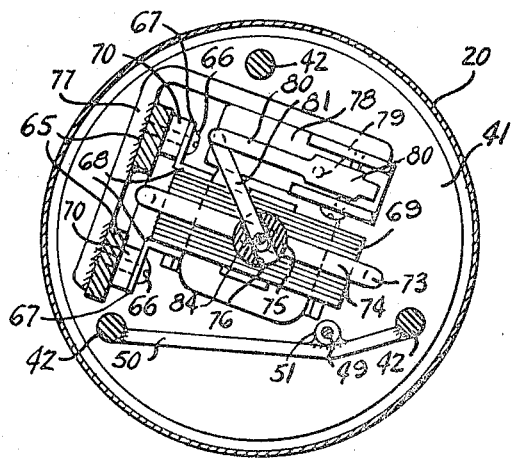
FIGURE 5 is a sectional view taken substantially along the line 5—5 of FIGURE 3, as viewed in the direction indicated by the arrows.
Figure 7:
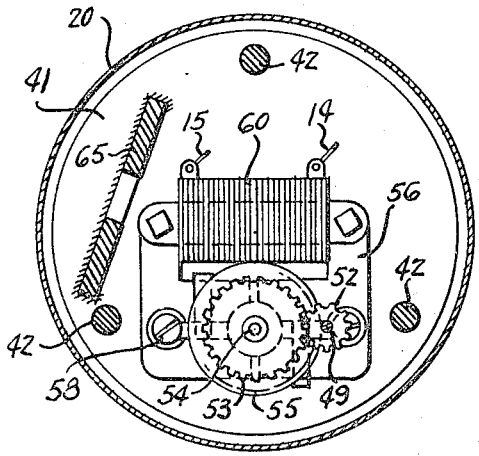
FIGURE 7 is a sectional view taken substantially along the line 7—7 of FIGURE 3, as viewed in the direction indicated by the arrows.
Figure 6:
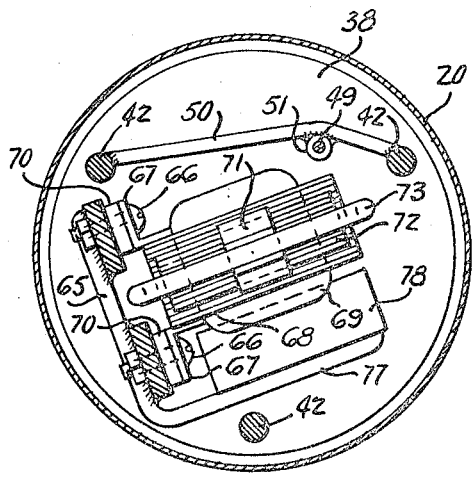
FIGURE 6 is a sectional view taken substantially along the line 6—6 of FIGURE 3 as viewed in the direction indicated by the arrows.

Having reference now to the drawings in detail, and more particularly to FIGS. 1-8, one embodiment of the device of the instant invention is generally indicated at 10. When in operating position this device may be inserted into a tubular receptacle 11 which is positioned in a hole in the ground G, in substantially flush relation as in the normal cup on a conventional green of a golf course. The receptacle 11 is preferably of waterproof material, such as metal or plastic, and is provided at its top with internal threads 12 which receive a closure cap shown in dotted lines in FIGURE 1 when the device 10 is removed therefrom or when the device is to be left therein to protect the same from water, dirt and vandalism, a locking means (not shown) being included if desired. An electrical conduit 13 containing wires 14 and 15 extends through an opening 16 in a side wall of receptacle 11, and is sealed by gaskets or bushings 17. An internal flange 18, or alternatively, spaced lugs support the bottom 19 of the casing or housing means 20 which comprises the exterior of the device 10. In the event that it is desired to employ a battery instead of an external current source, the battery indicated in dotted lines at B may be positioned below the flange or lugs 18 and suitably connected to the electrical apparatus interiorly of casing 20, in the same manner as the wires 14 and 15, as will be described hereinafter.

The casing or housing means 20 may be constructed of any suitable material, and the bottom 19 is securely affixed thereto as, for example, by means of a crimped rim 21. The top of the casing is open as indicated at 22, and has positioned therein a funnel-shaped frusto-conical member 23 having an opening 24 in the bottom thereof which is of a diameter slightly less than that of the article to be ejected by the device, the lower end of the frusto-conical member 23 defining a supporting means to support a golf ball B or other article to be ejected. An annular rim 25 which may be integral with the funnel-shaped cup or frusto-conical member 23 overlies the top rim of receptacle or housing means 20 and is provided with depending lugs 26 which are suitably affixed as by means of screws 27 to the top of receptacle 20.

A piston 30 is rotatably and reciprocably mounted in a depending circular flange 31 below the opening 24. The piston 30 has an inclined top surface 30' which serves as an eccentric when the piston is rotated in a manner to be described hereinafter. A rubber impact washer 32 is mounted on a flange 33 carried by piston 30 and is adapted when the piston is kicked upwardly, in a manner to be more fully described hereinafter, to engage an annular flange 34 integral with portion 31, or suitably affixed thereto, which serves as a stop to limit the upper movement of piston 30.

The lower end of piston 30 has a stem 35 which is secured within a central bore in a rotatable low-speed turntable means 36 which is suitably mounted on a bearing 37 for rotation on the top plate 38 of the fixed internal frame. The frame, generally indicated at 40, also includes a base plate 41 which seats on bottom 19, and which is provided with fitted apertures engaging the threaded ends of upright rods 42, the upper portions of which are secured in suitable openings in top plate 38 by means of lock nuts 43.

The turntable means 36 is rotated by means of a ring gear 44 affixed to the outer periphery thereof which in turn is engaged by a drive pinion 45 and mounted between bearings 46 on opposite sides of a bore 47 extending through plate 38, on pinion drive shaft 49. A lateral brace 50 extending transversely between two of the uprights 42 carries a guide bearing 51 through which the shaft 49 extends. A second pinion 52 at the lower end of shaft 49 engages a drive gear 53 carried by the drive shaft 54 of an electric motor 55. The motor 55 is supplied with current by the wires 14 and 15, and carries the usual plates 56 mounted on supports 57 by means of screws 58, the supports in turn seating on lower plate 41 of frame 40. The motor includes the usual frame 60, current being supplied through wires 14 and 15, as will be more fully pointed out hereinafter.

A vertical supporting plate 65 suitably secured to base 41 has secured thereto as by means of screws 66 the L-shaped mounting arm 67 of a solenoid coil frame 68 which carries a solenoid coil 69 forming part of an actuating means for energizing the article ejecting means. Insulating blocks 70 are positioned between the plate and the legs 67. A centrally disposed solenoid core 71 carries at its lower extremity a cross head 72 to which is secured a linearly movable rectangular yoke 73, to the upper transverse portion 74 of which is secured a split piston 75, the piston having a longitudinally extending transverse slot 76 therein.

An L-shaped supporting bracket 77 carries a normally open switch means in the form of a microswitch 78, which includes a top contact button 79 which is actuated by a corresponding contact carried by resilient spring arm 80. The arm 80 has an offset portion 81 which extends into the slot 76 in split piston 75.

A longitudinally extending vertical bore 82 extends through piston 30 and stem 35 and carries a linearly movable pin 84 defining an actuating member, the lower end of which normally rests on the free end of arm 81 interiorly of slot 76, the arrangement being such when a golf ball or other article is received in the funnel-shaped member 23 and engages the exposed upper end of the pin 84, the microswitch 78 is closed to actuate the article ejecting means which is defined by a plunger means including the piston 30, stem 35, split piston 75 and solenoid core 71.

Figure 8:
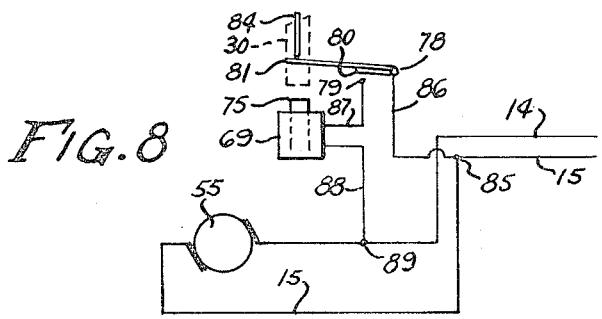
FIGURE 8 is a schematic wiring diagram illustrating the electrical circuitry of this embodiment.
Figure 12:
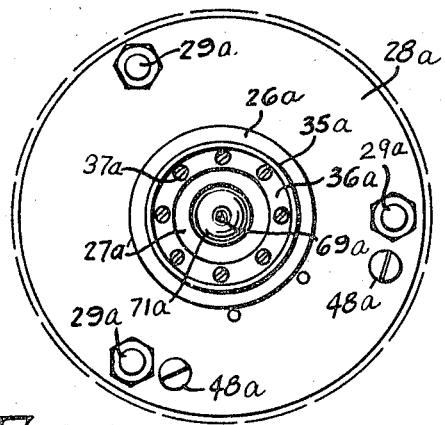
FIGURE 12 is a transverse sectional view taken substantially on line 12—12 of FIGURE 10 as viewed in the direction indicated by the arrows.
Figure 15:
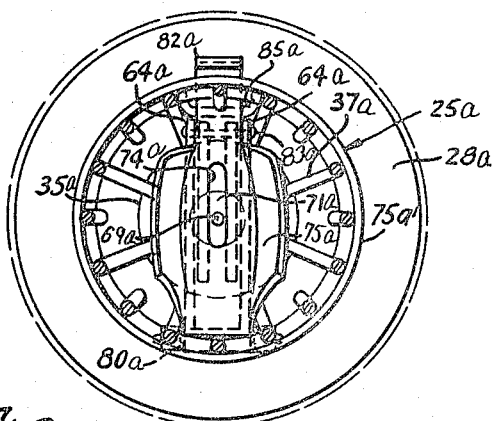
FIGURE 15 is a transverse cross-sectional view of FIGURE 10 taken substantially along line 15—15 as viewed in the direction indicated by the arrows.
Figure 13:
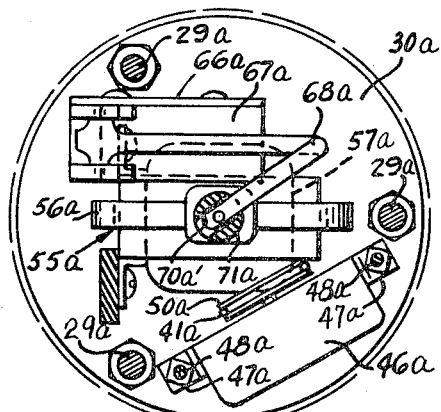
FIGURE 13 is a transverse cross-sectional view taken substantially on line 13—13 of FIGURE 10 as viewed in the direction indicated by the arrows.
Figure 9:
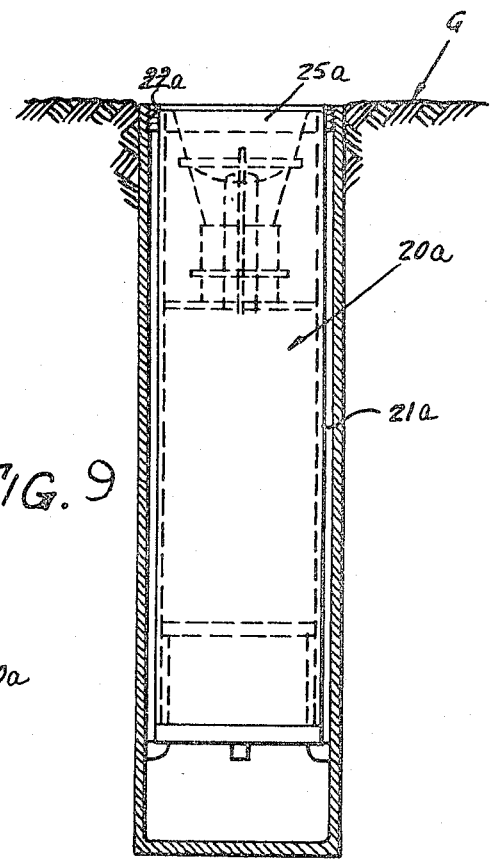
FIGURE 9 is a vertical sectional view through a practice hole showing the positioning of another embodiment of the device of this invention when used both for ejection and as a putt receiving means.
Figure 14:
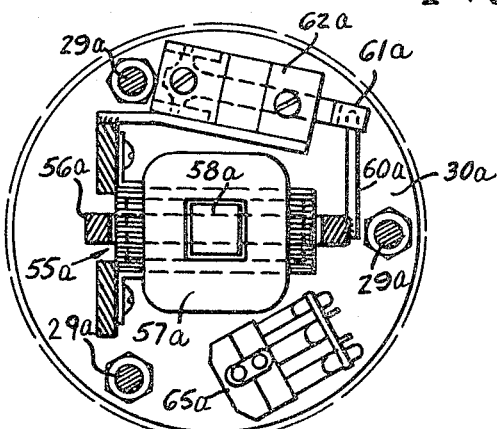
FIGURE 14 is a transverse cross-sectional view of FIGURE 10 taken substantially on line 14—14 as viewed in the direction indicated by the arrows.

Referring to FIGURE 8, it will be seen that wire 15 carries a terminal 85 from which a line 86 leads to one side of microswitch 78, a wire 87 extending from the other side or terminal 79 to solenoid coil 69. The other end of the solenoid coil 69 is connected through a wire 88 to a terminal 89 connecting with wire 14. The arrangement is thus such that closure of the switch means energizes the solenoid to extend the core 71 and its associated split piston 75 upwardly. The sharp impact of the upper end of split piston 75 against the lower end of stem 35 causes piston 30 to raise to the article ejecting position shown in dotted lines in FIGURE 3, the abrupt upward movement causing the article, such as the golf ball B shown in dotted lines in FIGURES 1 and 3, to roll out of the funnel-shaped cup member 23 and back onto the ground or green. It will also be seen that through the continuous connection to the motor 55 and the drive mechanism previously described the angular top of piston 30 is constantly rotating so that, at the moment of impact, the angularity thereof may be in any direction, and the consequent direction of the ejection of the article completely unpredictable. After the article has been ejected, the resilience of arm 80 reopens the microswitch, and upon de-energization of the solenoid coil 69, the plunger means drops by gravity into its normal inoperative position, until the pin is again impacted by another article.

Referring now to FIGS. 9-16, a second embodiment of the device of the instant invention is generally indicated at 20a and when in operating position serves to act as a golf ball ejecting means and a putt receiving means when inserted into housing means 21a which may be positioned in a receptacle in a hole in the ground G, in substantially flush relation as in the normal cup on a conventional green of a golf course. The outer receptacle is preferably of a waterproof material, such as metal or plastic, and is provided at its top with internal threads 22a which is adapted to receive a closure cap shown in dotted lines in FIG. 9 similar to the receptacle of the embodiment of FIGS. 1-8. Of course, the invention alternatively may be placed on the surface of the ground to operate as a ball dispensing means, if desired.

A source of electrical energy is defined by an electrical conduit means 23a containing wires 24a and 25a extending through bottom 32a of housing means 21a and sealed by gasket or other suitable means therein. Alternately a battery, such as shown in FIGURE 1, may be utilized as the source of electrical energy.

FIGURES 9–15 show that housing means 21a structurally supports therein invention 20a comprising basket means 25a, turntable means 26a mounted in bearing means 27a on a first support plate 28a supported by anchor bolts 29a connected to a second support plate means 30a supportably secured by upstanding tubular support means 31a secured to base means 32a.

Turntable means 26a has an upstanding apertured collar means 35a inside of which is affixed thereto support ring means 36a welded to radial basket support members 37a terminating in a top support ring means 38a.

Turntable means 26a is welded or fixed in turn to an apertured support collar means 39a carrying the inner race 27a' of bearing means 27a.

Collar means 39a carries at its lower end belt pulley groove means 40a which contacts belt means 41a over idle pulley means 42a secured by bearing means 43a to support plate means 28a by screw means 44a and mounting plate 45a.

A motor means 46a is supported by bracket means 47a secured to adjustable screw bolt means 48a which is secured in collar means 49a affixed to support plate means 28a.

Pulley means 50a of motor means 46a is aligned with pulley means 42a and carries belt means 41a to energize turntable means 26a through collar means 39a in turn rotating collar means 35a and basket support members 37a.

A solenoid assembly means 55a is comprised of yoke means 56a, solenoid means 57a, and piston means 58a. The piston means 58a is connected to a push rod means 71a together defining a plunger means which forms part of an article ejecting means, the piston means 58a forming the core of the solenoid means 57a. The yoke means 56a carries arm means 60a which contacts normally closed contact means c and d of a microswitch means 62a. The piston means 58a reciprocates in guide means 63a attached by bolt means 64a to yoke means 56a to move the plunger means between an inoperative position when the solenoid means 57a is not energized and an article ejecting position when the solenoid means 57a is energized.

Support plate means 30a supports relay means 65a as shown in a desirable conventional manner.

Yoke means 56a supports by bracket means 66a a second microswitch means 67a having normally open contacts a and b which carries an extending resilient spring contact arm means 68a which contacts an actuating member in the form of a pin rod means 69a carried in slotted aperture means 70a of the upper end portion of the push rod means 71a. Pin rod means 69a extends upwardly through basket means 25a and an aperture 74a in an article supporting means defined by cradle means 75a secured to basket means 25a, the pin rod means contacting an article such as the ball means 76a when the article is received by the cradle means 75a.

When solenoid means 57a is energized the upper end of push rod means 71a connected to piston means 58a moves upwardly to strike a pair of depending ears 71aa on the bottom portion of cradle means 75a. The cradle means 75a is hingedly secured by rod means 82a to pivot means 83a and 80a, the inertia of the impact tosses the article therein radially outwardly at random upon the ground depending on the position of the same when the solenoid means 57a is energized. Push rod means 71a may be of rubber or other suitable desirable impact means, if desired.

For purposes of clarity, the wiring hook-up to the motor 46a, solenoid means 57a, microswitches 62a and 67a and relay means 65a has been omitted in FIGS. 9–15.

Figures 10, 11:
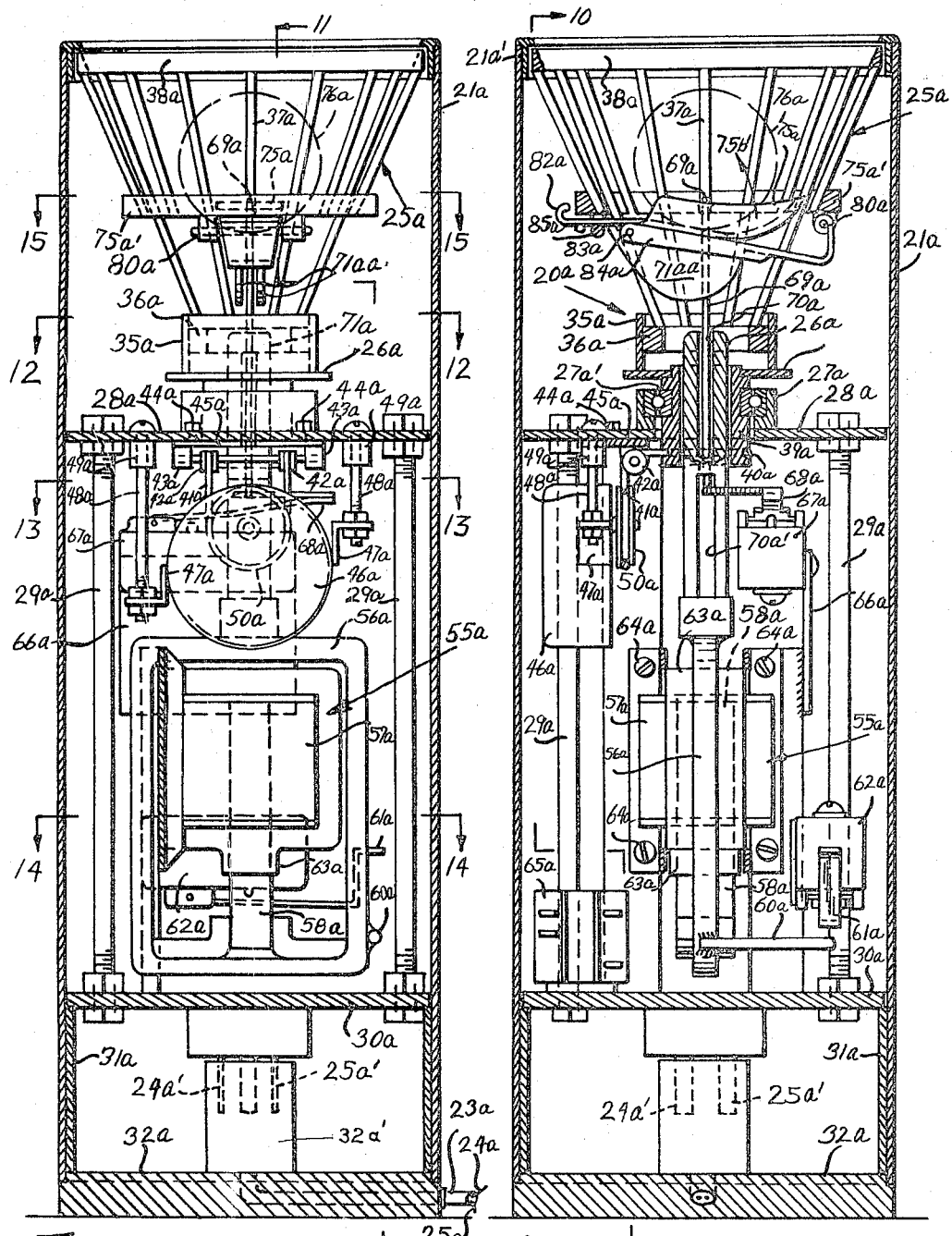
FIGURE 10 is a vertical sectional view of the modification of FIGURE 9 taken substantially on line 10—10 of FIGURE 11 as viewed in the direction indicated by the arrows.
FIGURE 11 is a vertical sectional view taken substantially on line 11—11 of FIGURE 10 as viewed in the direction indicated by the arrows.

Energizing wires 24a and 25a are connected to terminal means 24a' and 25a' secured to support plate means 30a, through socket 32a', as best shown in FIGS. 10 and 11.

Cradle means 75a is of a double pivoted radial action and is secured to rod means 82a being hingedly secured by pivot means 83a to lever means 84a which is secured to pivot means 80a of ring means 75a'. Rod means 82a rests on stop means 85a secured to ring means 75a' carried by radial basket members 37a.

Figure 17:
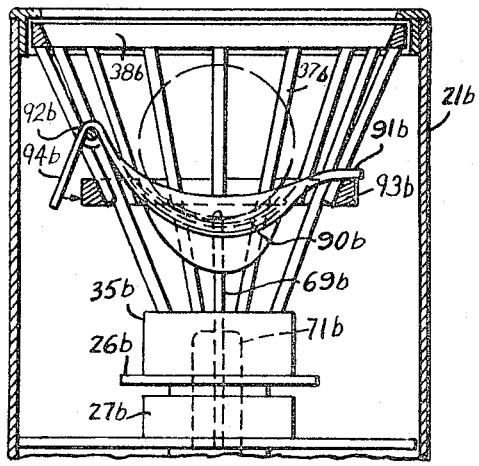
FIGURE 17 is an enlarged fragmentary vertical cross-sectional view through another modified form of the invention.
Figure 18:
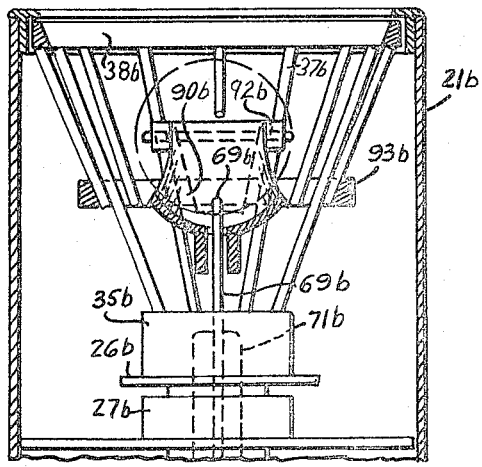
FIGURE 18 is a fragmentary vertical cross-sectional view taken at substantially 90 degrees with respect to FIGURE 17.
Figure 19:
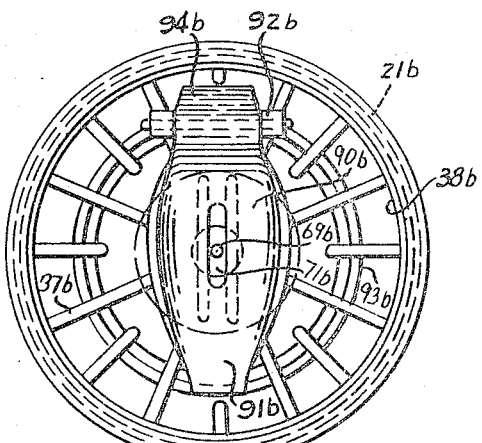
FIGURE 19 is a plan view of FIGURE 18.

FIGURES 17–19 show another modification of the invention wherein like parts are designated by the same reference numerals followed by the suffix b and in which the cradle means 90b is of a limited single pivotal action and is hinged by pivot means 92b to a pair of basket members 37b. Cradle means 90b extends in a downwardly extending lip portion 94b which contacts ring means 93b and limits the swing of cradle means 90b about pivot means 92b. Cradle means 90b also terminates in an end portion 91b which contacts ring means 93b before being actuated by push rod means 71b.

The modification of FIGURES 17–19 gives the cradle means a new and different mode of radial rejection operation for a golf ball or the like as distinguished from the novel double action mode of radial operation of cradle 75a of FIGURES 9–15.

Figure 16:
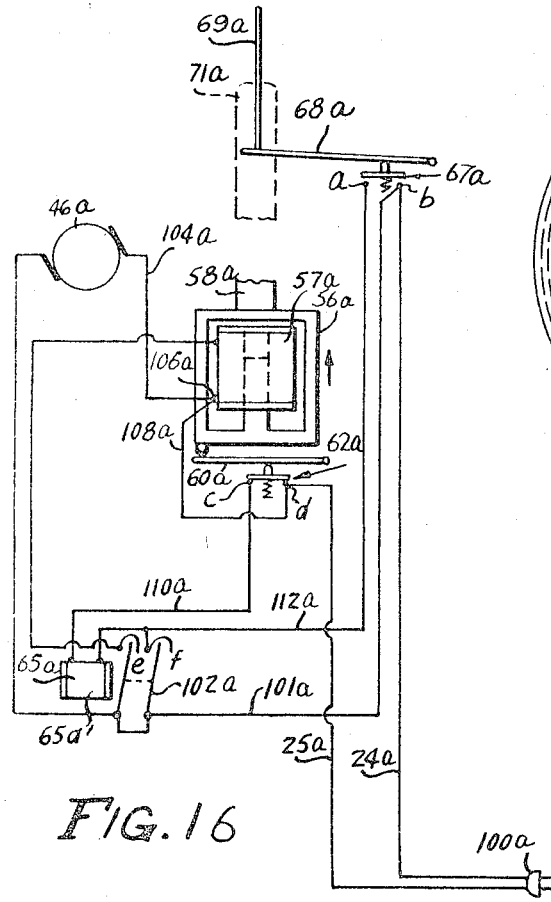
FIGURE 16 is a schematic electrical circuit diagram illustrating the electrical circuitry of this embodiment of the invention.

Referring to FIGURE 16, terminal plug means 100a energizes lead 24a connected to contact b of microswitch means 67a which is further connected by lead 101a across switch 102a of relay means 65a to one side of motor means 46a. The other side of motor means 46a is connected by lead means 104a to contact 106a of solenoid means 57a and further connected by lead means 108a to contact d of microswitch 62a. Contact d is connected to lead 25a. Terminal c of microswitch 62a is connected by lead 110a across the winding 65a' of relay means 65a to lead means 112a to contact a of microswitch 67a. The contacts a and b of microswitch 67a are normally open, and the contacts c and d of microswitch 62a are normally closed when there is no article in the cradle means. This being so, relay means 65a is not energized until microswitch 67a is closed. In other words, microswitch means 67a energizes solenoid means 57a through relay means 65a and microswitch means 62a de-energizes solenoid means 57a through relay means 65a.

The circuitry shown in FIGURE 16 is energized by a suitable source of electricity (not shown) interconnected to terminal plug means 100a. The circuit of FIGURE 16 performs like functions for the modifications of both FIGURES 9–15 and FIGURES 17–19.

When a ball is putted or an article received in the cradle means, it strikes pin rod means 69a which through spring arm means 68a closes the contacts a and b of microswitch means 67a to energize relay means 65a which in turn closes contacts e and f and energizes solenoid means 57a which actuates the plunger means to move the same upwardly to article ejecting position. When push rod means 71a strikes cradle means 75a it moves as a double action hinge means in the direction indicated by arrow means 75b' of FIGURE 11 to eject the article such as golf ball means 76a out onto the ground for a return practice putt. Relay means 65a energizes through its contacts e and f solenoid means 57a and holds it in until the plunger means reaches its top position at which time resilient spring arm means 60a opens the contacts c and d of microswitch means 62a which de-energizes solenoid means 57a to prevent further operation of the same another article is received by cradle means 75a during which time the motor remains energized. In other words, microswitch 67a selectively actuates relay means 65a to energize solenoid means 57a and at the maximum height of travel of push rod means 71a, arm 60a on piston means 58a opens the contacts c and d of microswitch means 62a de-energizing solenoid means 57a until another article strikes the pin rod means 69a and closes contacts a and b of microswitch 67a to repeat the solenoid cycle.

Referring now particularly to FIGURES 20 to 27, another embodiment of the device of the instant invention is designated generally by the reference numeral 20c which comprises basically a housing means or receptacle 21c which may be positioned in the ground as shown in FIGURE 20 and which replaces the double receptacle of the previous embodiments. The housing means 21c has internal threads 22c at its open upper end to receive a cover shown in dotted lines at 23c when the device is not in use. A source of electrical energy is defined by the conductor 24c having leads 25c and 26c extending to a suitable outlet (not shown). Of course, a battery may be utilized as the source of electrical energy, if desired. The conductor 24c passes through an opening 27c in the side of housing means 21c and is electrically connected to one-half 28c of a coupling means supported by bracket 29c in spaced relationship to the bottom 30c of the housing means 21c to preclude short circuiting in the event that some water leaks into the housing means. A complementary coupling means 31c is carried by the device 20c for electrically connecting the same to the source of electrical energy.

The device 20c has a base 32c which seats on the bottom 30c of the housing means 21c and includes a slot 33c (not particularly FIGURE 24) for passing over the bracket means 29c when inserting the device into the housing means 21c. A plurality of support rods 34c carry a solenoid means 35c which forms a portion of the actuating means of this embodiment.

A microswitch means 36c having normally spaced contacts 37c and 38c is supported by a bracket 39c and includes a contact arm 38c' biased by resilient spring means 40c to the contact open position.

The article to be ejected such as a golf ball 41c is received through the open top of the housing means 20c and is positioned by a ring member 42c on top of an article supporting means in the form of an annular coil 43c having oppositely disposed arms 44c and 45c slidingly received in apertured ears 46c and 47c, the arm 45c functioning as an actuating member and having its lower end in engagement with the contact arm 38c', the article supporting means being biased to an upward position by the resilient spring means 40c of the microswitch means 36c until an article overcomes the resilience of the spring means 40c to close the contacts 37c and 38c.

An article ejecting means in the form of a specially designed plunger means 50c shown in detail in FIGURES 25 and 26 includes a hollow tubular member with an offset eccentric upper portion 51c secured therein in any conventional manner. A weighted means 52c may be positioned within the plunger means 50c at any desired location to provide for increased impact during the ejection process. The plunger means 50c is slidable in unsupported relation within the solenoid means 35c and seats on a cork or other dampening member 53c carried by the base 32c. It has been found that a helical groove 54c defined in the tubular plunger means 50c causes the same to rotate when the plunger means is moved to an article ejecting position by the energizing of the solenoid means 35c. This causes random ejection of successive articles since the angularly offset eccentric face 51c is positioned in a different relationship each time. The circuitry in FIGURE 27 shows the leads 25c and 26c of the conductor 23c connected to the lower coupling means 28c which is electrically connected to the upper coupling means 31c. A conductor 55c extends from the upper coupling means 31c to the fixed contact 37c of the microswitch means 36c, a conductor 56c being electrically connected to the movable contact 38c at one end and to the solenoid means 35c at its other end. The opposite end of the coil of the solenoid means 35c is electrically connected by a conductor 57c to the other side of the upper coupling means 31c. Thus, it will be seen that when an article is received on the article supporting means 43c the actuating member 45c presses downwardly on the contact on 38c' to overcome the resilience of the spring means 40c and close the contacts 37c, 38c of the microswitch means 36c thereby energizing the solenoid means 35c and actuating the plunger means 50c to move the same to its article ejecting position wherein the offset eccentric face 51c engages an article carried by the article supporting means 43c to eject the same from the housing means 21c. As the plunger means 50c is actuated by the solenoid means 35c it slides upwardly in relatively loose fit therewithin and rotates due to the helical groove 54c to position the same in a different relationship for successive ejections. When it is desired to remove the device 20c from the housing means 21c for storage or maintenance, the ring means 42c is gripped and pulled upwardly to disconnect the coupling means 28c, 31c.

FIGURES 28 and 29 show a slightly modified device wherein parts similar to the embodiment of FIGURES 24 to 27 are designated by like reference numerals followed by the suffix d. In this embodiment the ring means is replaced by a frusto-conical funnel-shaped member 42d having oppositely disposed openings 42d' to facilitate gripping the same and removing the device in the manner explained for the other embodiment. The frusto-conical member 42d provides additional spinning to the ball if it is ejected in such a shallow arc that it engages the same as it passes out of the housing means 21d.

With the embodiment of FIGURES 24 to 27 and with the embodiment of FIGURES 28 and 29 the plunger means may be readily removed by engaging the article supporting means with manual pressure to close the contacts of the microswitch means and energize the solenoid means moving the plunger means 50c to its article ejecting position and grabbing the upper portion of the same as it extends beyond the article supporting means. A plunger means having a different shaped angularly offset eccentric face may then be readily substituted to provide for ejecting the article a different distance from the device.

It will now be seen that there is herein provided an improved device for randomly ejecting an article such as a golf ball or the like which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted as illustrative and not in a limiting sense.

I claim:
1. A device for randomly ejecting an article comprising a housing means having an open top, an article supporting means within said housing means adjacent said top, an article ejecting means having an inclined surface for operatively engaging an article received by said article supporting means to eject the same from said housing means, actuating means operatively connected to said article ejecting means for actuating the same, an actuating member of said actuating means being engaged by an article received by said article supporting means to actuate said ejecting means thereby ejecting the article from said housing means, and means for rotating said article ejecting means during actuation thereof whereby the direction of inclination of said surface is varied and articles successively received by said article supporting means are ejected in random radial directions.

2. The structure of claim 1 wherein said article ejecting means includes plunger means having an angularly offset face portion constituting said inclined surface.

3. The structure of claim 1 wherein said actuating means are electrically energized, and including a first electrical connector, which is adapted to be connected to a source of electricity, in said container, and a second connector, detachably connected to said first mentioned connector for supplying electricity to said actuating means.

4. The structure of claim 1 wherein said actuating means includes a source of electrical energy, a solenoid means, a switch means having a pair of normally spaced contacts, electrically conductive means defining a circuit including said source of electrical energy, said solenoid means and said switch means, said actuating member when engaged by an article received by said article supporting means closing said contacts of said switch means and thereby said circuit to energize said solenoid means, said article ejecting means including a plunger means at least a portion of which defines the core of said solenoid means, said plunger means being moved from an inoperative position to an article ejecting position on energization of said solenoid means.

5. The structure of claim 4 wherein said article supporting means includes a guide means having an open top portion larger than the size of the article and an open lower portion smaller than the size of the article, said actuating member being positioned within said guide means to be engaged by the article when it is received by said article supporting means, resilient means normally biasing said actuating member to a first position wherein said actuating member fails to close said contacts, and the weight of the article on the actuating member overcoming said resilient means thereby causing said actuating member to close said contacts and energize said solenoid means, and said plunger means to extend through said lower open portion to engage the article.

6. The structure of claim 4 wherein said article supporting means includes a movably supported ring means smaller than the size of the article, said actuating member being secured to said ring means, resilient means normally biasing said ring means to a first position wherein said actuating member fails to close said contacts, and the weight of the article on said ring means overcoming said resilient means thereby causing said actuating member to close said contacts and energize said solenoid means.

7. The structure of claim 4 wherein said means for rotating said article ejecting means includes a turntable means secured to a portion of said plunger means, and a motor means rotatably driving said turntable means, said motor means being operatively connected to said source of electrical energy.

8. The structure of claim 4 wherein said means for rotating said article ejecting means includes a turntable means secured to a portion of said article ejecting means, and a motor means rotatably driving said turntable means, said motor means being operatively connected to said source of electrical energy.

9. The structure of claim 4 wherein said plunger means includes a hollow tubular member slidable in unsupported relation within said solenoid means.

10. The structure of claim 9 wherein said means for rotating said article ejecting means includes a helical groove defined over at least a major portion of the length of said plunger means.

11. A golf practice putting cup comprising an open topped tubular housing means, an article supporting means including a conical cup having a bottom opening secured in said housing means, adjacent the open top, an article ejecting means including a linearly and rotatably movable cylindrical piston in said opening, said piston having a central bore and an eccentric top surface cut at an angle to the axis of rotation thereof, a rod extending through said bore into said cup, actuating means including a normally open switch means in said housing means having a spring contact arm, the lower end of said rod normally resting on said arm, an electric motor in said housing means, a source of electric current for said motor, means connecting said motor with said piston for continuously rotating the same whereby the direction of inclination of said top surface is continuously varied, a solenoid coil in said housing means, a movable core for said solenoid, a connection through said switch means from said coil to said source of electric current, and another piston carried by said core to impact the lower end of said first-mentioned piston on energization of said coil to move said first-mentioned piston into said cup to eject a ball therefrom, the impact of a ball falling into said cup forcing said rod downwardly to close said switch means to energize said coil whereby articles successively received by said article supporting means are ejected in random generally radial directions.

12. The structure of claim 11 wherein a frame is positioned in said housing means comprised of upper and lower plates and vertical uprights separating said plates, and said means connecting said first-mentioned piston to said motor for continuously rotating said piston constituting a turntable rotatably mounted on said upper plate having a ring gear thereon, said first-mentioned piston including a stem rotatable by said turntable, a first pinion engaging said ring gear, a vertical shaft carrying said first pinion at its top and a second pinion at its bottom, and a shaft driven by said motor having a drive gear thereon engaging said second pinion.

13. The structure of claim 12 wherein said frame is provided with an upright plate, said solenoid coil being secured to said plate and centrally positioned in said housing, and said solenoid core including a vertically disposed rectangular yoke surrounding said coil and movable with said core, and said second-mentioned piston being carried by the upper cross arm of said yoke.

14. The structure of claim 13 wherein the lower end of said conical cup includes a tubular portion into which said first-mentioned piston extends, a flange surrounds the outer side of said tubular portion, and a rubber impact gasket is carried by said first-mentioned piston and engageable with said flange to limit upward movement of said first-mentioned piston.

15. The structure of claim 14 including an external container adapted to be inserted in the ground, said container having a flange interiorly thereof upon which said housing means is seated, and wherein a battery positioned in said container below said flange constitutes said source of electric current.

References Cited by the Examiner

UNITED STATES PATENTS

| | | | |
|---|---|---|---|
| 286,868 | 10/1883 | Thompson | 273—138 X |
| 2,808,264 | 10/1957 | Scalf | 273—1.5 |
| 3,003,769 | 10/1961 | Brandell | 273—179 |
| 3,085,800 | 4/1963 | Holstad | 273—1.5 |
| 3,105,683 | 10/1963 | Kimbrell | 273—1.5 |

FOREIGN PATENTS

| | | |
|---|---|---|
| 747,456 | 3/1933 | France. |
| 12,566 | 1910 | Great Britain. |

RICHARD C. PINKHAM, *Primary Examiner.*

DELBERT B. LOWE, *Examiner.*

G. J. MARLO, *Assistant Examiner.*